(12) United States Patent
Ishikawa et al.

(10) Patent No.: US 10,773,502 B2
(45) Date of Patent: Sep. 15, 2020

(54) HEAT-SHRINKABLE MULTILAYER FILM AND HEAT-SHRINKABLE LABEL

(71) Applicant: GUNZE LIMITED, Ayabe-shi, Kyoto (JP)

(72) Inventors: Kiyoyasu Ishikawa, Shiga (JP); Naoyuki Maruichi, Shiga (JP); Yuki Ohama, Shiga (JP)

(73) Assignee: GUNZE LIMITED, Kyoto (JP)

( * ) Notice: Subject to any disclaimer, the term of this patent is extended or adjusted under 35 U.S.C. 154(b) by 6 days.

(21) Appl. No.: 15/325,298

(22) PCT Filed: Aug. 29, 2014

(86) PCT No.: PCT/JP2014/072767
§ 371 (c)(1),
(2) Date: Jan. 10, 2017

(87) PCT Pub. No.: WO2016/031056
PCT Pub. Date: Mar. 3, 2016

(65) Prior Publication Data
US 2017/0190158 A1  Jul. 6, 2017

(51) Int. Cl.
*B32B 27/30* (2006.01)
*G09F 3/04* (2006.01)
(Continued)

(52) U.S. Cl.
CPC ............ *B32B 27/302* (2013.01); *B32B 27/08* (2013.01); *B32B 27/30* (2013.01); *B32B 27/36* (2013.01);
(Continued)

(58) Field of Classification Search
None
See application file for complete search history.

(56) References Cited

U.S. PATENT DOCUMENTS

| | | | |
|---|---|---|---|
| 5,300,563 | A | 4/1994 | Kiang et al. |
| 5,385,987 | A | 1/1995 | Hamazaki et al. |

(Continued)

FOREIGN PATENT DOCUMENTS

| | | |
|---|---|---|
| CN | 101163828 | 4/2008 |
| CN | 101541533 | 9/2009 |

(Continued)

OTHER PUBLICATIONS

"Primalloy—Mitsubishi Chemicals" (Sep. 2013) (Year: 2013).*

(Continued)

*Primary Examiner* — Vivian Chen
(74) *Attorney, Agent, or Firm* — Hamre, Schumann, Mueller & Larson, P.C.

(57) ABSTRACT

The present invention provides a heat shrinkable multilayer film which has excellent adhesiveness between front and back layers and an interlayer not only at normal temperature but also at low temperature to effectively prevent delamination and is less likely to have residual white streaks along creases. The present invention also provides a heat shrinkable label including the heat shrinkable multilayer film. The present invention relates to a heat shrinkable multilayer film including: front and back layers each containing a polyester resin; an interlayer containing a polystyrene resin; and adhesive layers, the front and back layers and the interlayer being stacked with the adhesive layers interposed therebetween, the adhesive layers each containing 20 to 65% by weight of a polystyrene resin and 35 to 80% by weight of a polyester elastomer.

5 Claims, 3 Drawing Sheets

(51) Int. Cl.
| | |
|---|---|
| *B32B 27/08* | (2006.01) |
| *B32B 27/36* | (2006.01) |
| *B32B 7/12* | (2006.01) |
| *B32B 7/04* | (2019.01) |
| *C08L 25/08* | (2006.01) |
| *C08L 25/10* | (2006.01) |
| *C08L 67/03* | (2006.01) |
| *C08L 67/02* | (2006.01) |
| *C09J 125/10* | (2006.01) |
| *C09J 125/08* | (2006.01) |
| *C09J 167/02* | (2006.01) |
| *C09J 167/03* | (2006.01) |

(52) U.S. Cl.
CPC .................. *G09F 3/04* (2013.01); *B32B 7/04* (2013.01); *B32B 7/12* (2013.01); *B32B 2250/05* (2013.01); *B32B 2250/24* (2013.01); *B32B 2250/40* (2013.01); *B32B 2270/00* (2013.01); *B32B 2274/00* (2013.01); *B32B 2307/412* (2013.01); *B32B 2307/546* (2013.01); *B32B 2307/558* (2013.01); *B32B 2307/736* (2013.01); *B32B 2307/738* (2013.01); *B32B 2307/75* (2013.01); *B32B 2325/00* (2013.01); *B32B 2367/00* (2013.01); *B32B 2405/00* (2013.01); *B32B 2519/00* (2013.01); *C08L 25/08* (2013.01); *C08L 25/10* (2013.01); *C08L 67/02* (2013.01); *C08L 67/025* (2013.01); *C08L 67/03* (2013.01); *C08L 2201/10* (2013.01); *C08L 2203/16* (2013.01); *C09J 125/08* (2013.01); *C09J 125/10* (2013.01); *C09J 167/02* (2013.01); *C09J 167/025* (2013.01); *C09J 167/03* (2013.01); *C09J 2425/006* (2013.01); *C09J 2467/006* (2013.01); *Y10T 428/1328* (2015.01); *Y10T 428/31786* (2015.04); *Y10T 428/31797* (2015.04); *Y10T 428/31909* (2015.04); *Y10T 428/31913* (2015.04); *Y10T 428/31917* (2015.04); *Y10T 428/31924* (2015.04); *Y10T 428/31931* (2015.04); *Y10T 428/31938* (2015.04)

(56) References Cited

U.S. PATENT DOCUMENTS

| | | | |
|---|---|---|---|
| 5,543,474 A | 8/1996 | Kawaki et al. | |
| 5,550,190 A | 8/1996 | Hasegawa et al. | |
| 6,255,388 B1* | 7/2001 | Yamada | B29C 55/04 264/165 |
| 6,670,429 B2* | 12/2003 | Appelman | C08G 63/199 525/444 |
| 6,815,080 B2 | 11/2004 | Omori | |
| 8,691,394 B2* | 4/2014 | Maruichi | B32B 27/08 428/34.9 |
| 8,962,113 B2 | 2/2015 | Yamada et al. | |
| 9,028,933 B2* | 5/2015 | Maruichi | B32B 7/12 428/34.9 |
| 9,827,746 B2* | 11/2017 | Ishikawa | G09F 3/04 |
| 9,840,067 B2* | 12/2017 | Muta | B32B 27/302 |
| 9,845,386 B2* | 12/2017 | Maruo | B32B 25/14 |
| 2001/0041772 A1 | 11/2001 | Masubuchi et al. | |
| 2002/0147273 A1 | 10/2002 | Patel et al. | |
| 2003/0017223 A1 | 1/2003 | Tasaka et al. | |
| 2003/0059606 A1* | 3/2003 | Iijima | B32B 7/12 428/343 |
| 2004/0171766 A1 | 9/2004 | Agrawal | |
| 2004/0192844 A1* | 9/2004 | Ikematsu | C08K 5/14 525/93 |
| 2007/0065673 A1 | 3/2007 | Nanba et al. | |
| 2008/0026170 A1* | 1/2008 | Yamada | B29C 61/003 428/34.9 |
| 2008/0057236 A1* | 3/2008 | Yamada | B32B 27/36 428/34.9 |
| 2008/0090036 A1* | 4/2008 | Hiruma | B29C 55/023 428/34.9 |
| 2008/0269414 A1* | 10/2008 | Knoll | C08L 53/02 525/89 |
| 2008/0286540 A1* | 11/2008 | Tanaka | B32B 25/14 428/213 |
| 2009/0061193 A1 | 3/2009 | Hara et al. | |
| 2009/0074998 A1* | 3/2009 | Hiruma | B29C 61/003 428/34.9 |
| 2009/0202851 A1* | 8/2009 | Maruichi | B32B 27/08 428/483 |
| 2009/0212060 A1* | 8/2009 | Shinohara | B65B 7/285 220/661 |
| 2009/0280341 A1 | 11/2009 | Maruichi et al. | |
| 2009/0311503 A1* | 12/2009 | Maruo | B32B 25/14 428/220 |
| 2010/0055361 A1 | 3/2010 | Kawasaki et al. | |
| 2011/0041772 A1* | 2/2011 | Hargrove | A01K 5/0114 119/61.57 |
| 2013/0224412 A1* | 8/2013 | Muta | B32B 27/302 428/35.7 |
| 2013/0337278 A1* | 12/2013 | Ishikawa | B65D 23/0878 428/483 |
| 2014/0162077 A1* | 6/2014 | Maruichi | B32B 27/302 428/483 |
| 2014/0220369 A1* | 8/2014 | Ishikawa | G09F 3/04 428/483 |
| 2015/0018489 A1* | 1/2015 | Shiraishi | C08J 5/18 525/177 |
| 2016/0284248 A1* | 9/2016 | Banno | B32B 27/36 |
| 2017/0072668 A1* | 3/2017 | Ishikawa | B32B 27/22 |
| 2017/0095998 A1* | 4/2017 | Nakahara | B32B 27/30 |

FOREIGN PATENT DOCUMENTS

| | | |
|---|---|---|
| EP | 1 752 285 | 2/2007 |
| EP | 2039507 A * | 3/2009 |
| EP | 2 657 016 | 10/2013 |
| EP | 3 115 201 | 1/2017 |
| JP | 61-041543 | 2/1986 |
| JP | 02-206529 A * | 8/1990 |
| JP | 10-080977 | 3/1998 |
| JP | 10-130451 | 5/1998 |
| JP | 2000-289137 | 10/2000 |
| JP | 2002-046231 | 2/2002 |
| JP | 2002-155135 | 5/2002 |
| JP | 2002-351332 | 12/2002 |
| JP | 2004-001252 | 1/2004 |
| JP | 2004-276600 A * | 10/2004 |
| JP | 2005-111925 | 4/2005 |
| JP | 2005-111926 | 4/2005 |
| JP | 2006-015745 | 1/2006 |
| JP | 2006-159903 A * | 6/2006 |
| JP | 2006-315416 | 11/2006 |
| JP | 2007-083476 | 4/2007 |
| JP | 2008-037093 | 2/2008 |
| JP | 2008-037093 A * | 2/2008 |
| JP | 2008-307896 A * | 12/2008 |
| JP | 2009-000898 | 1/2009 |
| JP | 2009-000898 A * | 1/2009 |
| JP | 2009-043621 A * | 2/2009 |
| JP | 2009-154500 A * | 7/2009 |
| JP | 2009-220522 | 10/2009 |
| JP | 2009-241457 | 10/2009 |
| JP | 2010-241055 | 10/2010 |
| JP | 2010-264657 | 11/2010 |
| JP | 2010-264657 A * | 11/2010 |
| JP | 2010-284941 | 12/2010 |
| JP | 2011-056736 | 3/2011 |
| JP | 2011-201239 | 10/2011 |
| JP | 2011-201239 A * | 10/2011 |
| JP | 2014-172214 | 9/2014 |
| WO | 2005-118288 | 12/2005 |

(56) References Cited

FOREIGN PATENT DOCUMENTS

| WO | 2008/007710 | | | 1/2008 |
|---|---|---|---|---|
| WO | WO 2012/070130 | A | * | 5/2012 |
| WO | WO 2012/086704 | A | * | 6/2012 |
| WO | 2013/035706 | | | 3/2013 |

OTHER PUBLICATIONS

Jasna Djonlagic et al. "Thermoplastic Copolyester Elastomers." Handbook of Engineering and Speciality Thermoplastics, vol. 3. (Jun. 2011). (Year: 2011).*
"Dupont Hytrel Design Guide." pp. 1-8, 10, 14, 17, 21. (2013) (Year: 2013).*
"Grades & Material Properties of Pelprene™", (www.toyobo-global.com) webpage retrieved Oct. 21, 2011.
U.S. Appl. No. 14/179,808, filed Feb. 13, 2014, US 2014/0162077, Jun. 12, 2014.
Charles A. Harper, "Modern Plastics Handbook", Original edition copyright (2000) by the McGraw-Hill Companies, Inc., p. 486.

* cited by examiner

HEAT-SHRINKABLE MULTILAYER FILM AND HEAT-SHRINKABLE LABEL

TECHNICAL FIELD

The present invention relates to a heat shrinkable multilayer film which has excellent adhesiveness between front and back layers and an interlayer not only at normal temperature but also at low temperature to effectively prevent delamination and is less likely to have residual white streaks along creases. The present invention also relates to a heat shrinkable label including the heat shrinkable multilayer film.

BACKGROUND ART

Heat shrinkable labels, which are prepared by printing images on a base film made of heat shrinkable resin, are attached to various containers such as plastic bottles and metal cans these days.

For such heat shrinkable labels, polystyrene resin films are often used because of their excellent low-temperature shrinkability. However, polystyrene resin films are insufficient in heat resistance and solvent resistance. To solve this problem, polyester resin films with excellent heat resistance and solvent resistance have also been used. However, polyester resin films have poor low-temperature shrinkability and rapidly shrink, so that they easily wrinkle when attached to containers. Moreover, polyester resin films used as heat shrinkable labels are not readily torn along perforations provided for easy removal of the film from containers for recycling after use.

To solve such problems, for example, there have been studied multilayer films including polyester resin-containing front and back layers and a polystyrene resin-containing interlayer. Here, in multilayer films, it is an important issue to prevent delamination.

To prevent the delamination, adhesive layers are provided between the front and back layers and the interlayer. Patent Literature 1 discloses a heat shrinkable multilayer film in which an adhesive resin for adhesive layers is a resin mixture containing a polyester resin and a polystyrene resin. In such a heat shrinkable multilayer film, however, the adhesive strength between the front and back layers and the interlayer is low, that is, the adhesive strength between layers is not enough.

Patent Literature 2 discloses a heat shrinkable laminated film in which an adhesive resin contained in adhesive layers is a soft polystyrene resin having a styrene content of 10 to 50%, a modified styrene resin having a large elastomer content, a resin that has high affinity to and is compatible with polyesters, or a mixture of these.

These heat shrinkable laminated films however have a problem of insufficient adhesive strength between layers because the adhesive strength between the front and back layers and the interlayer is lowered after printing for use as a label.

Patent Literature 3 discloses a heat shrinkable multilayer film including a polyester elastomer as a component of adhesive layers.

However, such a heat shrinkable multilayer film sometimes have residual white streaks along creases, which are caused by folding with a strong pressure during center sealing in production of a heat shrinkable label. The creases remain even after the heat shrinkable label is placed on a container and heat-shrunk, resulting in impaired appearance of the film.

Even in the case of a heat shrinkable label including a multilayer film that has front and back layers each containing a polyester resin, an interlayer containing a polystyrene resin, and adhesive layers provided therebetween, when the heat shrinkable label is attached to a plastic bottle after storage in an low-temperature environment (e.g., storage in winter) or when the attachment is performed at low temperature, delamination may occur in the heat shrinkable label upon heat shrinkage, leading to defective appearance or detachment of the heat shrinkable label from the plastic bottle.

CITATION LIST

Patent Literature

Patent Literature 1: JP 2006-315416 A
Patent Literature 2: JP 2006-015745 A
Patent Literature 3: JP 2008-037093 A

SUMMARY OF INVENTION

Technical Problem

The present invention aims to provide a heat shrinkable multilayer film which has excellent adhesiveness between front and back layers and an interlayer not only at normal temperature but also at low temperature to effectively prevent delamination and is less likely to have residual white streaks along creases after heat shrinkage. The present invention also aims to provide a heat shrinkable label including the heat shrinkable multilayer film.

Solution to Problem

The present invention relates to a heat shrinkable multilayer film including: front and back layers each containing a polyester resin; an interlayer containing a polystyrene resin; and adhesive layers, the front and back layers and the interlayer being stacked with the adhesive layers interposed therebetween, the adhesive layers each containing 20 to 65% by weight of a polystyrene resin and 35 to 80% by weight of a polyester elastomer.

The present invention is specifically described in the following.

The present inventors found out that a heat shrinkable multilayer film in which front and back layers each containing a polyester resin and an interlayer containing a polystyrene resin are stacked through adhesive layers each containing a polystyrene resin and a polyester elastomer at a specific ratio has high adhesiveness between the layers (hereafter, also referred to as interlaminar strength) not only at normal temperature but also at low temperature and is less likely to have residual white streaks along creases. Such a heat shrinkable multilayer film excellent in adhesiveness and prevention of whitening along creases is favorably used for a heat shrinkable label to be attached to containers such as plastic bottles.

The term "normal temperature" as used herein refers to 18° C. to 28° C., and the term "low temperature" refers to 0° C. to 10° C.

The heat shrinkable multilayer film of the present invention contains front and back layers and an interlayer.

The "front and back layers" as used herein means both a front layer and a back layer. Accordingly, the heat shrinkable multilayer film of the present invention has a configuration in which an interlayer is sandwiched between a front layer and a back layer.

The front and back layers each contain a polyester resin.

Examples of the polyester resin include those obtainable by condensation polymerization of dicarboxylic acid components and diol components. Particularly preferred are aromatic polyester resins containing 55 mol % or more of terephthalic acid as a dicarboxylic acid component in 100 mol % of the dicarboxylic acid components. The aromatic polyester resins may contain, in addition to terephthalic acid, any of o-phthalic acid, isophthalic acid, succinic acid, adipic acid, sebacic acid, azelaic acid, octylsuccinic acid, cyclohexane dicarboxylic acid, naphthalene dicarboxylic acid, fumaric acid, maleic acid, itaconic acid, decamethylene carboxylic acid, anhydrides thereof, and lower alkyl esters thereof, as the dicarboxylic acid component.

Any diol component may be used. Examples thereof include aliphatic diols such as ethylene glycol, 1,3-propanediol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butanediol, neopentyl glycol (2,2-dimethylpropane-1,3-diol), 1,2-hexanediol, 2,5-hexanediol, 2-methyl-2,4-pentanediol, 3-methyl-1,3-pentanediol, 2-ethyl-1,3-hexanediol, and polytetramethylene ether glycol; and alicyclic diols such as 2,2-bis(4-hydroxycyclohexyl)propane, alkylene oxide adducts of 2,2-bis(4-hydroxycyclohexyl)propane, 1,4-cyclohexanediol, and 1,4-cyclohexane dimethanol.

Preferred among the polyester resins are those containing a component derived from terephthalic acid as a dicarboxylic acid component, and a component derived from ethylene glycol and/or 1,4-cyclohexane dimethanol as a diol component. By using such an aromatic polyester random copolymer resin, excellent shrinkability can be provided to the heat shrinkable multilayer film.

For even higher shrinkability, the amount of the component derived from ethylene glycol is preferably 60 to 80 mol % and the amount of the component derived from 1,4-cyclohexane dimethanol is preferably 10 to 40 mol % in 100 mol % of the diol components.

Such an aromatic polyester random copolymer resin may optionally further contain a component derived from diethylene glycol in an amount of 0 to 30 mol %, preferably 1 to 25 mol %, more preferably 2 to 20 mol %. Use of diethylene glycol leads to increased tensile elongation at break in the main shrinkage direction of the heat shrinkable multilayer film, which prevents the front and back layers on the inner side of the film from remaining on a container due to delamination when the film is torn along perforations. When the amount of the component derived from diethylene glycol is more than 30 mol %, the heat shrinkable multilayer film has excessively increased low-temperature shrinkability and easily wrinkles when attached to a container.

The polyester resin containing a component derived from terephthalic acid as a dicarboxylic acid component may contain a component derived from 1,4-butanediol as a diol component. Such a polyester resin is generally referred to as polybutylene terephthalate resin.

The polybutylene terephthalate resin is preferably used in combination with the aromatic polyester random copolymer resin containing a component derived from terephthalic acid as a dicarboxylic acid component and a component derived from ethylene glycol and 1,4-cyclohexane dimethanol as a diol component. Use of such a mixed resin provides excellent finish quality.

The polybutylene terephthalate resin may be a polybutylene terephthalate resin consisting only of a component derived from terephthalic acid and a component derived from 1,4-butanediol, or may be a polybutylene terephthalate resin containing a dicarboxylic acid component other than a component derived from terephthalic acid and/or a diol component other than a component derived from 1,4-butanediol.

The amount of the dicarboxylic acid component other than a component derived from terephthalic acid is preferably 10 mol % or less in 100 mol % of the dicarboxylic acid components. When the amount is more than 10 mol %, the polybutylene terephthalate resin has low heat resistance, possibly causing economic disadvantages. The amount of the diol component other than a component derived from 1,4-butanediol is preferably 10 mol % or less in 100 mol % of the diol components. When the amount is more than 10 mol %, the polybutylene terephthalate resin has low heat resistance, possibly causing economic disadvantages.

The amount of the polybutylene terephthalate resin to be added is not limited, and is preferably 30% by weight or less. When the amount is more than 30% by weight, the spontaneous shrinkage may be great, or the film may have low rigidity.

The lower limit of the glass transition temperature of the polyester resin constituting the front and back layers is preferably 55° C., and the upper limit thereof is preferably 95° C. When the glass transition temperature is lower than 55° C., the shrinkage starting temperature of the heat shrinkable multilayer film may be too low, the spontaneous shrinkage may be great, and/or blocking is likely to occur. When the glass transition temperature is higher than 95° C., the heat shrinkable multilayer film may have reduced low-temperature shrinkability and reduced shrink finish quality or show a great decrease in the low-temperature shrinkability with time, and/or the resin may suffer whitening upon stretching. The lower limit of the glass transition temperature is more preferably 60° C., and the upper limit thereof is more preferably 90° C. The lower limit is still more preferably 65° C., and the upper limit is still more preferably 85° C.

The glass transition temperature of the polyester resin can be measured by a method in conformity with JIS K 7121 (1987).

The tensile modulus of elasticity of the polyester resin constituting the front and back layers is preferably more than 1000 MPa, and the upper limit thereof is preferably 4000 MPa. When the tensile modulus of elasticity is 1000 MPa or less, the shrinkage starting temperature of the heat shrinkable film may be too low, or the spontaneous shrinkage thereof may be great. When the tensile modulus of elasticity is more than 4000 MPa, the heat shrinkable multilayer film may have reduced low-temperature shrinkability and reduced shrink finish quality, or may show a great decrease in the low-temperature shrinkability with time. The lower limit of the tensile modulus of elasticity is more preferably 1500 MPa, and the upper limit thereof is more preferably 3700 MPa.

The tensile modulus of elasticity can be measured in accordance with ASTM-D882 (Test A).

Examples of commercially available polyester resins for constituting the front and back layers include "Easter", "Embrace LV" (both produced by Eastman Chemical Company), "BELLPET" (produced by Bell Polyester Products, Inc.), and "NOVADURAN" (produced by Mitsubishi Engineering-Plastics Corporation).

The front and back layers may contain one polyester resin having the above-described composition alone, or may contain two or more polyester resins having the above composition. The front and the back layers may contain different polyester resins with different compositions, but preferably contain the same polyester resin to prevent troubles due to curling up of the film.

The front and back layers may optionally contain additives such as an antioxidant, a heat stabilizer, an ultraviolet absorber, a light stabilizer, a lubricant, an antistatic agent, an anti-blocking agent, a flame retardant, an antimicrobial, a fluorescent whitening agent, and a colorant.

The interlayer contains a polystyrene resin.

Examples of the polystyrene resin include aromatic vinyl hydrocarbon-conjugated diene copolymers, mixed resins of an aromatic vinyl hydrocarbon-conjugated diene copolymer and an aromatic vinyl hydrocarbon-unsaturated aliphatic carboxylate copolymer, and rubber-modified high impact polystyrenes. The polystyrene resin allows the heat shrinkable multilayer film of the present invention to start shrinking at low temperature and to have high shrinkability.

The "aromatic vinyl hydrocarbon-conjugated diene copolymer" as used herein means a copolymer containing a component derived from an aromatic vinyl hydrocarbon and a component derived from a conjugated diene.

Any aromatic vinyl hydrocarbon may be used. Examples thereof include styrene, o-methylstyrene, and p-methylstyrene. These may be used alone or in combination of two or more thereof. Any conjugated diene may be used. Examples thereof include 1,3-butadiene, 2-methyl-1,3-butadiene, 2,3-dimethyl-1,3-butadiene, 1,3-pentadiene, and 1,3-hexadiene. These may be used alone or in combination of two or more thereof.

The aromatic vinyl hydrocarbon-conjugated diene copolymer preferably contains a styrene-butadiene copolymer (SBS resin) for particularly excellent heat shrinkability. For production of a heat shrinkable multilayer film with less fish eyes, the aromatic vinyl hydrocarbon-conjugated diene copolymer preferably contains an aromatic vinyl hydrocarbon-conjugated diene copolymer prepared using 2-methyl-1,3-butadiene (isoprene) as the conjugated diene, such as a styrene-isoprene copolymer (SIS resin) or a styrene-isoprene-butadiene copolymer (SIBS).

The aromatic vinyl hydrocarbon-conjugated diene copolymer may contain any one of SBS resin, SIS resin, and SIBS resin alone, or may contain more than one of them in combination. In the case of using more than one of SBS resin, SIS resin, and SIBS resin, the resins may be dry-blended with each other, or the resins with a predetermined composition may be knead-pelletized through an extruder and the obtained compound resin may be used.

In the case that the aromatic vinyl hydrocarbon-conjugated diene copolymer contains one or more of SBS resin, SIS resin, and SIBS resin, the styrene content is preferably 65 to 90% by weight, and the conjugated diene content is preferably 10 to 35% by weight in 100% by weight of the aromatic vinyl hydrocarbon-conjugated diene copolymer, for a heat shrinkable multilayer film with particularly excellent heat shrinkability. A styrene content of more than 90% by weight or a conjugated diene content of less than 10% by weight may cause a heat shrinkable multilayer film to easily break due to a tension or may cause it to unexpectedly break during processing such as printing. A styrene content of less than 65% by weight or a conjugated diene content of more than 35% by weight may cause impurities such as gel to be produced during a molding process or may cause a heat shrinkable multilayer film to have poor strength, possibly resulting in poor handleability.

The aromatic vinyl hydrocarbon-unsaturated aliphatic carboxylate copolymer herein means a copolymer containing a component derived from an aromatic vinyl hydrocarbon and a component derived from an unsaturated aliphatic carboxylate.

The aromatic vinyl hydrocarbon is not particularly limited, and may be the same aromatic vinyl hydrocarbon as that used for the aromatic vinyl hydrocarbon-conjugated diene copolymer. The unsaturated aliphatic carboxylate is not particularly limited, and examples thereof include methyl (meth)acrylate, butyl (meth)acrylate, 2-ethylhexyl (meth)acrylate, lauryl (meth)acrylate, and stearyl (meth)acrylate. The term "(meth)acrylate" includes both acrylate and methacrylate.

In the case where the aromatic vinyl hydrocarbon-unsaturated aliphatic carboxylate copolymer is a styrene-butyl acrylate copolymer, the styrene content is preferably 60 to 90% by weight and the butyl acrylate content is preferably 10 to 40% by weight in 100% by weight of the styrene-butyl acrylate copolymer. An aromatic vinyl hydrocarbon-unsaturated aliphatic carboxylate copolymer with such a composition enables to provide a heat shrinkable multilayer film with excellent heat shrinkability.

No particular limitation exists in the mixed resin of the aromatic vinyl hydrocarbon-conjugated diene copolymer and the aromatic vinyl hydrocarbon-unsaturated aliphatic carboxylate copolymer. The mixed resin is preferably one containing 80% by weight or less of the aromatic vinyl hydrocarbon-unsaturated aliphatic carboxylate copolymer.

The rubber-modified high impact polystyrene is one mainly having a continuous phase of a styrene-alkyl methacrylate-alkyl acrylate terpolymer and a dispersed phase of a conjugated-diene-based rubber component.

Examples of the alkyl methacrylate constituting the continuous phase include methyl methacrylate and ethyl methacrylate. Examples of the alkyl acrylate include methyl acrylate, ethyl acrylate, propyl acrylate, and butyl acrylate.

The proportion of styrene in the terpolymer constituting the continuous phase is preferably 20 to 80% by weight, more preferably 30 to 70% by weight. The proportion of an alkyl methacrylate is preferably 10 to 50% by weight, more preferably 15 to 40% by weight. The proportion of an alkyl acrylate is preferably 1 to 30% by weight, more preferably 5 to 20% by weight.

The conjugated-diene-based rubber component constituting the dispersed phase is preferably polybutadiene or a styrene-butadiene copolymer containing 5 to 30% by weight of styrene.

The conjugated-diene-based rubber component in the dispersed phase preferably has a particle size of 0.1 to 1.2 µm, more preferably 0.3 to 0.8 µm. A particle size of smaller than 0.1 µm may result in insufficient impact resistance of the rubber-modified high impact polystyrene, whereas a dispersed phase with a particle size of greater than 1.2 µm may result in poor transparency of the interlayer.

In the rubber-modified high impact polystyrene, the proportion of the continuous phase composed of the terpolymer of styrene-alkyl methacrylate-alkyl acrylate is preferably 70 to 95% by weight and the proportion of the dispersed phase composed of the conjugated-diene-based rubber component is preferably 5 to 20% by weight. When the proportion of the dispersed phase is less than 5% by weight, the rubber-modified high impact polystyrene may have insufficient impact resistance. When the proportion of the dispersed phase is greater than 20% by weight, the interlayer may have poor transparency.

The lower limit of the Vicat softening temperature of the polystyrene resin is preferably 60° C., and the upper limit thereof is preferably 85° C. When the Vicat softening temperature is lower than 60° C., the heat shrinkable multilayer film has excessively high low-temperature shrinkability and easily wrinkles when attached to a container. When the Vicat softening temperature is higher than 85° C., the heat shrinkable multilayer film has poor low-temperature shrinkability, and thus a non-shrinking portion tends to be formed when the film is attached to a container. The lower limit of the Vicat softening temperature is more preferably 65° C., and the upper limit thereof is more preferably 80° C. The Vicat softening temperature can be measured in accordance with JIS K 7206 (1999).

The lower limit of the melt flow rate (MFR) at 200° C. of the polystyrene resin is preferably 2 g/10 min, and the upper limit thereof is preferably 15 g/10 min. When the MFR at 200° C. is less than 2 g/10 min, the film is difficult to form. When the MFR at 200° C. is more than 15 g/10 min, the film has low mechanical strength and will not endure practical use. The lower limit of the MFR at 200° C. is more preferably 4 g/10 min, and the upper limit thereof is more preferably 12 g/10 min. The MFR can be measured in accordance with ISO 1133.

Examples of commercially available products of the polystyrene resin constituting the interlayer include "CLEAREN" (Denki Kagaku Kogyo Kabushiki Kaisha), "ASAFLEX" (Asahi Kasei Chemicals Corporation), "Styrolux" (BASF SE), and "PSJ-polystyrene" (PS Japan Corporation).

The interlayer may optionally contain additives such as an antioxidant, a thermal stabilizer, an ultraviolet absorber, a light stabilizer, a lubricant, an antistatic agent, an antiblocking agent, a flame retardant, an antibacterial agent, a fluorescent brightener, and a colorant.

In the heat shrinkable multilayer film of the present invention, the front and back layers and the interlayer are stacked through adhesive layers each containing 20 to 65% by weight of a polystyrene resin and 35 to 80% by weight of a polyester elastomer.

The use of such adhesive layers enhances the adhesive strength between the layers of the heat shrinkable multilayer film not only at normal temperature but also at low temperature and prevents generation of white streaks along creases when the heat shrinkable multilayer film is folded.

The polystyrene resin used for the adhesive layers may be the same as or different from that used for the interlayer. When a different polystyrene resin is used, the polystyrene resin is preferably softer than the polystyrene resin used for the interlayer.

For excellent adhesiveness, the polystyrene resin used for the adhesive layers preferably contains an aromatic vinyl hydrocarbon-conjugated diene copolymer, particularly preferably a styrene-butadiene copolymer (SBS resin). In the case of using a styrene-butadiene copolymer, the butadiene content thereof is preferably larger than that of the styrene-butadiene copolymer used for the interlayer in terms of excellent adhesiveness. For a heat shrinkable multilayer film with even better adhesiveness, the polystyrene resin preferably contains an aromatic vinyl hydrocarbon-conjugated diene copolymer prepared using 2-methyl-1,3-butadiene (isoprene) as the conjugated diene, such as a styrene-isoprene copolymer (SIS resin) or a styrene-isoprene-butadiene copolymer (SIBS). Further, the polystyrene resin may contain a hydrogenated styrene resin prepared by hydrogenating an aromatic vinyl hydrocarbon-conjugated diene copolymer, such as a styrene-butadiene-butylene copolymer (SBBS resin) or a styrene-ethylene-butylene copolymer (SEBS resin), in an amount that the hydrogenated styrene resin does not become a main component of the polystyrene resin. A polystyrene resin mainly containing a hydrogenated styrene resin tends to lower the transparency.

The polystyrene resin may contain any one of SBS resin, SIS resin, and SIBS resin alone, or may contain more than one of them in combination. In the case of using more than one of SBS resin, SIS resin, SIBS resin, SBBS resin, and SEBS resin, the resins may be dry-blended with each other, or the resins with a predetermined composition may be knead-pelletized through an extruder and the obtained compound resin may be used.

In the case that the polystyrene resin is an aromatic vinyl hydrocarbon-conjugated diene copolymer and contains one or more of SBS resin, SIS resin, and SIBS resin, the styrene content is preferably 50 to 90% by weight and the conjugated diene content is preferably 10 to 50% by weight in 100% by weight of the aromatic vinyl hydrocarbon-conjugated diene copolymer, for a heat shrinkable multilayer film with excellent adhesive strength between the layers. When the styrene content is less than 50% by weight or the conjugated diene content is more than 50% by weight, gel or like impurities are more likely to be produced during a molding process. When the styrene content is more than 90% by weight or the conjugated diene content is less than 10% by weight, the adhesive strength between the layers tends to be low.

In the case where the polystyrene resin is blended with a hydrogenated styrene resin, the hydrogenated styrene resin preferably has a styrene content of 20 to 80% by weight and a butadiene-butylene or ethylene-butylene content of 20 to 80% by weight, for a heat shrinkable multilayer film with excellent adhesive strength between the layers. When the styrene content is less than 20% by weight, the adhesive strength between the layers tends to be lowered. When the styrene content is more than 80% by weight, the heat resistance may be lowered.

The lower limit of the Vicat softening temperature of the polystyrene resin used for the adhesive layers is preferably 50° C., and the upper limit thereof is preferably 85° C. When the Vicat softening temperature is lower than 50° C., the heat shrinkable multilayer film tends to suffer delamination due to heating during attaching the film to a container. When the Vicat softening temperature is higher than 85° C., the heat shrinkable multilayer film tends to have low adhesive strength. The lower limit of the Vicat softening temperature is more preferably 55° C., still more preferably 60° C., particularly preferably 65° C. The upper limit is more preferably 80° C. The Vicat softening temperature can be determined in accordance with JIS K7206 (1999).

The lower limit of a melt flow rate (MFR) at 200° C. of the polystyrene resin used for the adhesive layers is preferably 2 g/10 min, and the upper limit thereof is preferably 15 g/10 min. When the MFR at 200° C. is less than 2 g/10 min, the resin remains in an extruder in a continuous production process, easily causing gel or like impurities. When the MFR at 200° C. is more than 15 g/10 min, sufficient pressure is not applied during a film forming process, which tends to cause large variation in the thickness. The lower limit of the MFR at 200° C. is more preferably 4 g/10 min, and the upper limit thereof is more preferably 12 g/10 min. The MFR can be measured in accordance with ISO 1133.

The polyester elastomer used for the adhesive layers contains a polyester as a hard segment and a polyether or a polyester as a soft segment with high rubber elasticity. Specific examples thereof include a block copolymer containing an aromatic polyester as a hard segment and an aliphatic polyether as a soft segment, and a block copolymer containing an aromatic polyester as a hard segment and an aliphatic polyester as a soft segment. The polyester elastomer is preferably a saturated polyester elastomer, particularly preferably a saturated polyester elastomer containing a polyalkylene ether glycol segment as a soft segment.

The saturated polyester elastomer containing the polyalkylene ether glycol segment is preferably, for example, a block copolymer containing an aromatic polyester as a hard segment and a polyalkylene ether glycol as a soft segment.

In the case where the polyester elastomer used is a block copolymer containing an aromatic polyester and a polyalkylene ether glycol, the lower limit of the proportion of a polyalkylene ether glycol segment is preferably 5% by weight, and the upper limit thereof is preferably 90% by weight. When the proportion is less than 5% by weight, the adhesiveness to the interlayer may be lowered. When the proportion is more than 90% by weight, the adhesiveness to the front and back layers may be lowered. The lower limit is more preferably 30% by weight and the upper limit is more preferably 80% by weight. The lower limit is still more preferably 55% by weight.

Examples of the polyalkylene ether glycol include polyethylene glycol, poly(propylene ether) glycol, poly(tetramethylene ether) glycol, and poly(hexamethylene ether) glycol.

The lower limit of the number average molecular weight of the polyalkylene ether glycol is preferably 400, and the upper limit thereof is preferably 6000. The lower limit is more preferably 600, and the upper limit is more preferably 4000. The lower limit is still more preferably 1000 and the upper limit is still more preferably 3000. The use of a polyalkylene ether glycol having a number average molecular weight within the above range favorably provides excellent interlaminar strength. The number average molecular weight as used herein is measured by gel permeation chromatography (GPC).

The polyester elastomer may be produced by any method. For example, it may be produced by preparing an oligomer by esterification reaction or transesterification reaction using the following raw materials: (i) a C2-C12 aliphatic and/or alicyclic diol, (ii) an aromatic dicarboxylic acid and/or an alicyclic dicarboxylic acid, or an ester thereof, and (iii) a polyalkylene ether glycol with a number average molecular weight of 400 to 6000, and then performing condensation polymerization of the resulting oligomer.

Examples of the C2-C12 aliphatic and/or alicyclic diol include those typically used as a raw material of a polyester, especially as a raw material of a polyester thermoplastic elastomer. Specific examples thereof include ethylene glycol, propylene glycol, trimethylene glycol, 1,4-butanediol, 1,4-cyclohexanediol, and 1,4-cyclohexane dimethanol. Preferred among these diols are ethylene glycol and 1,4-butanediol, with 1,4-butanediol being more preferred. These may be used alone or in combination of two or more thereof.

Examples of the aromatic dicarboxylic acid and/or the alicyclic dicarboxylic acid include those typically used as a raw material of a polyester, especially as a raw material of a polyester thermoplastic elastomer. Specific examples thereof include terephthalic acid, isophthalic acid, phthalic acid, 2,6-naphthalene dicarboxylic acid, and cyclohexane dicarboxylic acid. Preferred among these dicarboxylic acids are terephthalic acid and 2,6-naphthalene dicarboxylic acid, with terephthalic acid being more preferred. These may be used alone or in combination of two or more thereof.

Examples of such polyester elastomers that are commercially available include "PRIMALLOY" (produced by Mitsubishi Chemical Corporation), "PELPRENE" (produced by Toyobo Co., Ltd.), and "Hytrel" (produced by Du Pont-Toray Co., Ltd.).

The polyester elastomer preferably has a melting point of 120° C. to 200° C. When the melting point is lower than 120° C., the heat resistance may be low, which easily causes peeling of the film from a solvent sealed portion when the film is attached to a container as a heat shrinkable label. When the melting point is higher than 200° C., sufficient adhesive strength may not be achieved. The lower limit of the melting point is more preferably 130° C., and the upper limit thereof is more preferably 190° C.

The melting point can be measured by a method in conformity with JIS-K 7121 (1987) using a differential scanning calorimeter (DSC-60, produced by Shimadzu Corporation).

The melting point of the polyester elastomer is affected by the copolymerization ratio between the polyester as a hard segment and the polyether or the polyester as a soft segment and the structure of these segments. The melting point of the polyester elastomer usually tends to depend on the copolymerization amount of the polyether or the polyester as a soft segment. A larger copolymerization amount of the polyether or the polyester leads to a lower melting point, whereas a smaller copolymerization amount thereof leads to a higher melting point.

The melting point of a polyester as a hard segment constituting the polyester elastomer may be adjusted by changing the copolymerization components of the polyester, whereby the melting point of the entire polyester elastomer may be adjusted.

A decrease in the molecular weight of the polyether or the polyester as a soft segment decreases the blocking properties of the polyester elastomer to be obtained, and thus tends to lead to a lower melting point.

The lower limit of a JIS-D hardness of the polyester elastomer is preferably 10, and the upper limit thereof is preferably 80. When the JIS-D hardness is 10 or more, the adhesive layers have improved mechanical strength. When the JIS-D hardness is 80 or less, the adhesive layers have improved flexibility and improved impact resistance. The lower limit of the JIS-D hardness of the polyester elastomer is more preferably 15, the upper limit thereof is more preferably 70. The lower limit is still more preferably 20, and the upper limit is still more preferably 60.

The JIS-D hardness can be measured in accordance with JIS K 6253 (2012) using a durometer (Type D).

The lower limit of the specific gravity of the polyester elastomer is preferably 0.95, and the upper limit thereof is preferably 1.20. When the specific gravity is 0.95 or more, heat resistance can be provided to the film, which prevents peeling of the film from a solvent sealed portion when the film is attached to a container as a heat shrinkable label. When the specific gravity is 1.20 or less, the adhesive strength between the front and back layers and the interlayer can be high.

The lower limit of the specific gravity is more preferably 0.98, and the upper limit thereof is more preferably 1.18.

The specific gravity can be measured in accordance with JIS K 7112 (1999) by a water displacement method.

The lower limit of the tensile modulus of elasticity of the polyester elastomer constituting the adhesive layers is preferably 1 MPa, and the upper limit thereof is preferably 1000 MPa. When the tensile modulus of elasticity is less than 1 MPa, the adhesive layers tend to have low mechanical strength. When the tensile modulus of elasticity is more than 1000 MPa, the adhesive strength between the front and back layers and the interlayer tends to be low. The lower limit of the tensile modulus of elasticity is more preferably 5 MPa, and the upper limit thereof is more preferably 900 MPa. The tensile modulus of elasticity can be measured in accordance with ASTM-882 (Test A).

The lower limit of the glass transition temperature of the polyester elastomer constituting the adhesive layers is preferably −70° C., and the upper limit thereof is preferably 0° C. When the glass transition temperature is lower than −70° C., resin blocking is likely to occur to lower the handling properties. When the glass transition temperature is higher than 0° C., the adhesive strength between the front and back layers and the interlayer tends to be low. The lower limit of the glass transition temperature is more preferably −60° C., and the upper limit thereof is more preferably −5° C. The glass transition temperature of the polyester elastomer can be calculated from the tan δ peak that is obtained by a method in conformity with JIS K 7244 (1999).

The polyester elastomer may be a modified product. Examples of the modified product include a modified polyester elastomer obtained by grafting an α,β-ethylenically unsaturated carboxylic acid to the polyester elastomer.

Examples of the α,β-ethylenically unsaturated carboxylic acid include unsaturated carboxylic acids such as acrylic acid, maleic acid, fumaric acid, tetrahydrofumaric acid, itaconic acid, citraconic acid, crotonic acid, and isocrotonic acid; and unsaturated carboxylic anhydrides such as 2-octen-1-yl succinic anhydride, 2-dodecen-1-yl succinic anhydride, 2-octadecen-1-yl succinic anhydride, maleic anhydride, 2,3-dimethylmaleic anhydride, bromomaleic anhydride, dichloromaleic anhydride, citraconic anhydride, itaconic anhydride, 1-butene-3,4-dicarboxylic anhydride, 1-cyclopentene-1,2-dicarboxylic anhydride, 1,2,3,6-tetrahydrophthalic anhydride, 3,4,5,6-tetrahydrophthalic anhydride, exo-3,6-epoxy-1,2,3,6-tetrahydrophthalic anhydride, 5-norbornene-2,3-dicarboxylic anhydride, methyl-5-norbornene-2, 3-dicarboxylic anhydride, endo-bicyclo[2.2.2]oct-5-ene-2,3-dicarboxylic anhydride, and bicyclo[2.2.2]oct-7-ene-2,3,5,6-tetracarboxylic anhydride. Preferred among these α,β-ethylenically unsaturated carboxylic acids are acid anhydrides because they have high reactivity.

The lower limit of the amount of the polystyrene resin in the adhesive layer is 20% by weight, and the upper limit thereof is 65% by weight.

When the amount of the polystyrene resin is less than 20% by weight, the film has residual white streaks along creases when strongly folded in production of a heat shrinkable label, resulting in impaired appearance of the film. When the amount of the polystyrene resin is more than 65% by weight, sufficient interlaminar strength may not be achieved at low temperature, and delamination tends to occur during the actual use. The lower limit of the amount of the polystyrene resin is preferably 25% by weight, more preferably 30% by weight, and the upper limit thereof is preferably 60% by weight, more preferably 55% by weight, particularly preferably 49% by weight.

The lower limit of the amount of the polyester elastomer in the adhesive layer is 35% by weight, and the upper limit thereof is 80% by weight.

When the amount of the polyester elastomer is less than 35% by weight, sufficient interlaminar strength may not be achieved at low temperature, and delamination tends to occur during the actual use. When the amount of the polyester elastomer is more than 80% by weight, the film has residual white streaks along creases when strongly folded in production of a heat shrinkable label, resulting in impaired appearance of the film. The lower limit of the amount of the polyester elastomer is preferably 40% by weight, more preferably 45% by weight, particularly preferably 51% by weight, and the upper limit is preferably 75% by weight, more preferably 70% by weight.

The adhesive layers preferably contain, as a polystyrene resin, a styrene-butadiene copolymer (SBS resin), a styrene-isoprene copolymer (SIS resin) prepared using 2-methyl-1, 3-butadiene (isoprene), a styrene-isoprene-butadiene copolymer (SIBS), or the like. The polyester elastomer preferably contains a block copolymer composed of a polyester as a hard segment and a polyalkylene ether as a soft segment, and may be a modified product thereof.

The adhesive layers may optionally contain additives such as an antioxidant, a heat stabilizer, an ultraviolet absorber, a light stabilizer, a lubricant, an antistatic agent, an anti-blocking agent, a flame retardant, an antimicrobial, a florescent whitening agent, and a colorant.

The lower limit of the total thickness of the heat shrinkable multilayer film of the present invention is preferably 10 µm, and the upper limit thereof is preferably 100 µm. The lower limit thereof is more preferably 15 µm, and the upper limit thereof is more preferably 80 µm. The lower limit is still more preferably 20 µm, and the upper limit is still more preferably 70 µm. When the total thickness of the heat shrinkable multilayer film is within the above range, the heat shrinkable multilayer film can be excellent in heat shrinkability, converting properties (e.g., printing properties, center sealing properties), and attachability.

In the heat shrinkable multilayer film of the present invention, the lower limit of the thickness of each of the front and back layers is preferably 5% of the total thickness of the heat shrinkable multilayer film, and the upper limit thereof is preferably 25%. The lower limit of the thickness of the interlayer is preferably 50% of the total thickness of the heat shrinkable multilayer film, and the upper limit thereof is preferably 90%. When the thickness of each of the front and back layers and that of the interlayer are within the above ranges, the heat shrinkable multilayer film can have high interlaminar strength and high transparency.

In the heat shrinkable multilayer film of the present invention, the lower limit of the thickness of each of the adhesive layers is preferably 0.3 µm, and the upper limit thereof is preferably 3.0 µm. When the thickness of the adhesive layer is less than 0.3 µm, the adhesive layer may not have sufficient adhesiveness. When the thickness of the adhesive layer is more than 3.0 µm, the heat shrinkable multilayer film may have low heat shrinkage properties and low optical properties. The lower limit of the thickness of each of the adhesive layer is more preferably 0.5 µm, and the upper limit thereof is more preferably 2.0 µm.

The total thickness of the heat shrinkable multilayer film can be adjusted by subtracting the thickness of the adhesive layers from the total thickness and then adjusting the thickness of the front and back layers and the interlayer.

In the case that the heat shrinkable multilayer film of the present invention has a five-layer structure of front layer (A)/adhesive layer (E)/interlayer (B)/adhesive layer (E)/back layer (C) with a total thickness of 40 µm, the thickness of each of the front layer (A) and the back layer (C) is preferably 2.0 to 10.0 µm, more preferably 3.0 to 8.0 µm. The thickness of each of the adhesive layers (E) is preferably 0.3 to 3.0 μm, more preferably 0.5 to 2.0 μm. The thickness of the interlayer (B) is preferably 19.0 to 35.4 μm, more preferably 20.0 to 33.0 μm.

The heat shrinkable multilayer film of the present invention may have a structure in which a unit of adhesive layer (E)/interlayer (C)/adhesive layer (E) is repeated between the front layer (A) and the back layer (C), such as a structure of front layer (A)/adhesive layer (E)/interlayer (B)/adhesive layer (E)/interlayer (B)/adhesive layer (E)/interlayer (B)/adhesive layer (E)/back layer (C). In the case where the total thickness of the heat shrinkable multilayer film is 40 μm, the front layer (A) and the back layer (C) each preferably have a thickness of 2.0 to 10.0 μm, more preferably 3.0 to 8.0 μm. The total thickness of the adhesive layers (E) is preferably 1.0 to 10.0 μm, more preferably 1.5 to 8.0 μm. The total thickness of the interlayers (B) is preferably 18.0 to 34.0 μm, more preferably 19.0 to 31.0 μm.

The unit of adhesive layer (E)/interlayer (C)/adhesive layer (E) may be repeated between the front layer (A) and the back layer (C) by joining resins extruded from extruders together in a feed block, or joining resins to form a unit of adhesive layer (E)/interlayer (C)/adhesive layer (E) first and then forming the structure in which the unit is repeated with use of a multiplier.

The structure in which the unit of adhesive layer (E)/interlayer (C)/adhesive layer (E) is repeated between the front layer (A) and the back layer (C) can suppress peeling because a stress due to impact applied to the label can be dispersed.

In the heat shrinkable multilayer film of the present invention, the shrinkage in the main shrinkage direction when the film is immersed in hot water at 70° C. for 10 seconds is preferably 5 to 50%, more preferably 8 to 47%, still more preferably 10 to 45%, particularly preferably 15 to 45%. The shrinkage in the main shrinkage direction when the film is immersed in hot water at 80° C. for 10 seconds is preferably 35 to 70%, more preferably 38 to 69%, still more preferably 41 to 68%, particularly preferably 43 to 67%. The shrinkage in the main shrinkage direction when the film is immersed in boiling water for 10 seconds is preferably 65 to 85%, more preferably 68 to 83%, still more preferably 70 to 82%. With such a shrinkage, excellent shrink finish quality by a hot air tunnel or a steam tunnel can be achieved.

The heat shrinkable multilayer film of the present invention preferably has an interlaminar strength in a direction (MD direction) orthogonal to the main shrinkage direction (TD direction) of 0.50 to 2.00 N/10 mm at normal temperature. When the interlaminar strength is less than 0.50 N/10 mm, delamination may occur when the film is attached as a heat shrinkable label to a container. The lower limit of the interlaminar strength is more preferably 0.60 N/10 mm, still more preferably 0.70 N/10 mm.

The heat shrinkable multilayer film of the present invention preferably has an interlaminar strength in the main shrinkage direction (TD direction) of 0.50 to 2.00 N/10 mm. When the interlaminar strength is less than 0.50 N/10 mm, delamination may occur due to abrasion during transport of labeled containers in a cardboard box. The lower limit of the interlaminar strength is more preferably 0.60 N/10 mm, still more preferably 0.70 N/10 mm.

The heat shrinkable multilayer film of the present invention preferably has an interlaminar strength in the main shrinkage direction (TD direction) at low temperature of 0.50 to 2.00 N/10 mm. When the interlaminar strength is less than 0.50 N/10 mm, delamination may occur when the film used as a label is put in a label-attaching machine at low temperature or during transport of labeled containers in a cardboard box at low temperature. The lower limit of the interlaminar strength is more preferably 0.60 N/10 mm, still more preferably 0.70 N/10 mm.

The interlaminar strength can be measured by, for example, peeling the layers in the 180-degree direction in the MD direction or TD direction and measuring the interlaminar strength at that time using a peel tester or an autograph.

The heat shrinkable multilayer film of the present invention may be produced by any method, and preferably produced by simultaneously forming all the layers by a co-extruding method. In the case of co-extrusion using a T-die, the layers may be stacked by a feed block technique, a multi-manifold technique, or a combination thereof.

Specifically, for example, the heat shrinkable multilayer film of the present invention can be produced by individually putting materials for the front and back layers, the interlayer, and the adhesive layers in an extruder; extruding the materials into a sheet through a multilayer die; cooling and solidifying the sheet with take-up rolls; and uniaxially or biaxially stretching the sheet.

The stretching can be performed by, for example, a roll stretching method, a tenter stretching method, or a combination thereof. The stretching temperature depends on factors such as the softening temperature of the resins constituting the film and required shrinkage properties of the heat shrinkable multilayer film. The lower limit of the stretching temperature is preferably 65° C., and the upper limit thereof is preferably 120° C. The lower limit is more preferably 70° C., and the upper limit is more preferably 115° C. The stretch ratio in the main shrinkage direction depends on factors such as the resins constituting the film, the method of stretching the film, and the stretching temperature. The ratio is preferably three times or more, more preferably four times or more, whereas preferably seven times or less, more preferably 6.5 times or less. A stretching temperature and a stretch ratio within such ranges lead to excellent thickness accuracy, and prevent the front and back layers on the inner side of the film from remaining on a container due to delamination when the film is torn along perforations.

The usage of the heat shrinkable multilayer film of the present invention is not limited. Since the heat shrinkable multilayer film of the present invention has high interlaminar strength, suppresses delamination when scratched at an overlapped portion or torn along perforations after attachment to a container, and has excellent transparency, the heat shrinkable multilayer film is suitably used as, for example, a base film for heat shrinkable labels to be attached to containers such as plastic bottles and metal cans. A heat shrinkable label including the heat shrinkable multilayer film of the present invention is also encompassed by the present invention.

Advantageous Effects of Invention

The present invention can provide a heat shrinkable multilayer film which has excellent adhesiveness between front and back layers and an interlayer to effectively prevent delamination and is less likely to have residual white streaks along creases.

The heat shrinkable multilayer film of the present invention does not suffer zipping even if delamination occurs because the interlaminar strength is uniform. Moreover, since no delamination occurs at the interface between the front or back layer and the adhesive layer, the heat shrinkable multilayer film of the present invention hardly cause peeling of the heat shrinkable label. In addition, the heat shrinkable multilayer film of the present invention has excellent transparency and maintains that transparency even after attachment.

The present invention can further provide a heat shrinkable label including the heat shrinkable multilayer film. The heat shrinkable label of the present invention is less likely to suffer delamination at a solvent sealed portion, effectively preventing peeling of the heat shrinkable label.

DESCRIPTION OF EMBODIMENTS

Embodiments of the present inventions are described below in detail with reference to examples. The present invention is not limited to the examples.

Materials used in the examples and comparative examples are listed below.

(Polyester Resin)

PET-1: an aromatic polyester random copolymer resin (glass transition temperature: 69° C.) containing a dicarboxylic acid component (100 mol % of terephthalic acid) and diol components (65 mol % of a component derived from ethylene glycol, 12 mol % of a component derived from diethylene glycol, 23 mol % of a component derived from 1,4-cyclohexane dimethanol) and having a tensile modulus of elasticity of 2000 MPa PET-2: an aromatic polyester random copolymer resin (glass transition temperature: 85° C.) containing a dicarboxylic acid component (100 mol % of terephthalic acid) and diol components (68 mol % of a component derived from ethylene glycol, 2 mol % of a component derived from diethylene glycol, 30 mol % of a component derived from 1,4-cyclohexane dimethanol) and having a tensile modulus of elasticity of 1950 MPa (Polystyrene Resin)

PS-1: styrene-butadiene copolymer (78% by weight of styrene, 22% by weight of butadiene, Vicat softening temperature: 72° C., MFR: 5.6 g/10 min)

PS-2: styrene-butadiene copolymer (80% by weight of styrene, 20% by weight of butadiene, Vicat softening temperature: 75° C., MFR: 5.5 g/10 min)

PS-3: styrene-butadiene copolymer (84% by weight of styrene, 16% by weight of butadiene, Vicat softening temperature: 75° C., MFR: 6.2 g/10 min)

PS-4: styrene-butadiene copolymer (80% by weight of styrene, 20% by weight of butadiene, Vicat softening temperature: 76° C., MFR: 9.7 g/10 min)

PS-5: styrene-butadiene copolymer (71% by weight of styrene, 29% by weight of butadiene, Vicat softening temperature: 72° C., MFR: 6.1 g/10 min)

PS-6: styrene-butadiene copolymer (72% by weight of styrene, 28% by weight of butadiene, Vicat softening temperature: 78° C., MFR: 7.2 g/10 min)

PS-7: styrene-butadiene copolymer (76% by weight of styrene, 24% by weight of butadiene, Vicat softening temperature: 80° C., MFR: 8.4 g/10 min)

PS-8: styrene-ethylene-butylene copolymer (67% by weight of styrene, 33% by weight of ethylene-butylene, MFR: 5.3 g/10 min, JIS-D hardness: 71)

(Polyester Elastomer)

TPE-1: polyester elastomer (melting point: 163° C., specific gravity: 1.15, JIS-D hardness: 40, glass transition temperature: −35° C., tensile modulus of elasticity: 38 MPa) composed of a polyester as a hard segment and a polyalkylene ether glycol as a soft segment TPE-2: polyester elastomer (melting point: 183° C., specific gravity: 1.07, JIS-D hardness: 39, glass transition temperature: −47° C., tensile modulus of elasticity: 35 MPa) composed of a polyester as a hard segment and a polyalkylene ether glycol as a soft segment and modified with maleic acid The glass transition temperature of each polyester resin was measured by a method in conformity with JIS K 7121 (1987) using a differential scanning calorimeter (DSC-60, Shimadzu Corporation).

The Vicat softening temperature was measured in accordance with JIS K 7206 (1999). Specifically, a specimen was taken from each of the above polystyrene resins. Then, a needle-shaped indenter was placed on the specimen, and the temperature was raised at 120° C./h while applying a load of 10 N to the indenter. The temperature at which the needle-shaped indenter entered the specimen by 1 mm was measured as the Vicat softening temperature.

The MFR was measured by a method in conformity with ISO 1133. Specifically, each polystyrene resin was molten at 200° C. and the amount of resin ejected at a load of 5 kg for each 10 minutes was measured.

The melting point of each polyester elastomer was measured by a method in conformity with JIS-K 7121 (1987) using a differential scanning calorimeter (DSC-60, Shimadzu Corporation) at a rate of temperature rise of 10° C./min.

The specific gravity of each polyester elastomer was measured in conformity with JIS K 7112 (1999) by a water displacement method in which ethanol was used as an immersion liquid (electron specific gravity meter MD-300S, Alfa Mirage Co., Ltd.).

JIS-D hardness of each polyester elastomer was measured by a method in conformity with JIS-K 6235 (2012) using a durometer (Asker durometer (type-D), Kobunshi Keiki Co., Ltd.).

The glass transition temperature of each polyester elastomer was measured by a method in conformity with JIS K 7244 (1999) using a dynamic viscoelasticity measuring device (Q800, TA Instruments, Japan.) in a tensile mode.

The tensile modulus of elasticity was measured by a method in conformity with ASTM-D882. Specifically, a non-stretched sheet of each of the polyester resins and the polyester elastomers was subjected to measurement using Strograph VE10 (Toyo Seiki Seisakusho, Ltd.).

Example 1

The resin used for the front and back layers was the polyester resin (PET-1).

The resin used for the interlayer was the polystyrene resin (PS-1).

The resins used for the adhesive layers were 60% by weight (60 parts by weight) of the polystyrene resin (PS-5) and 40% by weight (40 parts by weight) of the polyester elastomer (TPE-1).

The resins were put in an extruder with a barrel temperature of 160° C. to 250° C., and extruded through a multilayer die at 250° C. into a five-layer sheet. The sheet was cooled and solidified on take-up rolls at 30° C. Subsequently, the sheet was stretched at a stretch ratio of six times in a tenter stretching machine with a preheating zone (105° C.), a stretching zone (90° C.), and a heat setting zone (85° C.). The stretched sheet was wound on a winder. Thus, a heat shrinkable multilayer film was obtained in which the direction orthogonal to the main shrinkage direction was MD, and the main shrinkage direction was TD.

The heat shrinkable multilayer film had a five-layer structure of front or back layer (4.0 μm)/adhesive layer (0.8 μm)/interlayer (25.4 μm)/adhesive layer (0.8 μm)/front or back layer (4.0 μm), with a total thickness of 35 μm.

Example 2

A film having a five-layer structure of front or back layer (3.7 μm)/adhesive layer (0.7 μm)/interlayer (26.2 μm)/adhesive layer (0.7 μm)/front or back layer (3.7 μm) with a total thickness of 35 μm was produced in the same manner as in Example 1, except that the resins used for the adhesive layer were 60% by weight of the polystyrene resin (PS-6) and 40% by weight of the polyester elastomer (TPE-1).

Example 3

A film having a five-layer structure of front or back layer (5.0 μm)/adhesive layer (0.7 μm)/interlayer (23.6 μm)/adhesive layer (0.7 μm)/front or back layer (5.0 μm) with a total thickness of 35 μm was produced in the same manner as in Example 1, except that the resin used for the interlayer was the polystyrene resin (PS-2) and the resins used for the adhesive layers were 50% by weight of the polystyrene resin (PS-5) and 50% by weight of the polyester elastomer (TPE-2).

Example 4

A film having a five-layer structure of front or back layer (4.0 μm)/adhesive layer (0.8 μm)/interlayer (25.4 μm)/adhesive layer (0.8 μm)/front or back layer (4.0 μm) with a total thickness of 35 μm was produced in the same manner as in Example 1, except that the resin used for the interlayer was the polystyrene resin (PS-2) and the resins used for the adhesive layers were 40% by weight of the polystyrene resin (PS-5) and 60% by weight of the polyester elastomer (TPE-1).

Example 5

A film having a five layer structure of front or back layer (5.0 μm)/adhesive layer (0.8 μm)/interlayer (23.4 μm)/adhesive layer (0.8 μm)/front or back layer (5.0 μm) with a total thickness of 35 μm was produced in the same manner as in Example 1, except that the resin used for the interlayer was the polystyrene resin (PS-3) and the resins used for the adhesive layers were 40% by weight of the polystyrene resin (PS-5) and 60% by weight of the polyester elastomer (TPE-2).

Example 6

A film having a five-layer structure of front or back layer (3.5 μm)/adhesive layer (0.8 μm)/interlayer (26.4 μm)/adhesive layer (0.8 μm)/front or back layer (3.5 μm) with a total thickness of 35 μm was produced in the same manner as in Example 1, except that the resin used for the front and back layers was the polyester resin (PET-2), the resin used for the interlayer was the polystyrene resin (PS-4), and the resins used for the adhesive layers were 20% by weight of the polystyrene resin (PS-5) and 80% by weight of the polyester elastomer (TPE-2).

Example 7

A film having a five-layer structure of front or back layer (4.0 μm)/adhesive layer (0.8 μm)/interlayer (25.4 μm)/adhesive layer (0.8 μm)/front or back layer (4.0 μm) with a total thickness of 35 μm was produced in the same manner as in Example 1, except that the resin used for the front and back layers was the polyester resin (PET-2), the resin used for the interlayer was the polystyrene resin (PS-3), and the resins used for the adhesive layers were 50% by weight of the polystyrene resin (PS-6) and 50% by weight of the polyester elastomer (TPE-1).

Example 8

A film having a five-layer structure of front and back layer (3.5 μm)/adhesive layer (0.8 μm)/interlayer (26.4 μm)/adhesive layer (0.8 μm)/front or back layer (3.5 μm) with a total thickness of 35 μm was produced in the same manner as in Example 1, except that the resin used for the front and back layers was the polyester resin (PET-2), the resin used for the interlayer was the polystyrene resin (PS-2), and the resins used for the adhesive layers were 25% by weight of the polystyrene resin (PS-7) and 75% by weight of the polyester elastomer (TPE-2).

Example 9

A film having a five-layer structure of front or back layer (4.5 μm)/adhesive layer (0.9 μm)/interlayer (29.2 μm)/adhesive layer (0.9 μm)/front or back layer (4.5 μm) with a total thickness of 40 μm was produced in the same manner as in Example 1, except that the resin used for the front and back layers was the polyester resin (PET-1), the resin used for the interlayer was the polystyrene resin (PS-1), and the resins used for the adhesive layers were 20% by weight of the polystyrene resin (PS-5), 15% by weight of the polystyrene resin (PS-8) and 65% by weight of the polyester elastomer (TPE-1).

Comparative Example 1

A film having a five-layer structure of front or back layer (5.5 μm)/adhesive layer (0.8 μm)/interlayer (27.4 μm)/adhesive layer (0.8 μm)/front or back layer (5.5 μm) with a total thickness of 40 μm was produced in the same manner as in Example 1, except that the resins used for the adhesive layers were 75% by weight of the polystyrene resin (PS-5) and 25% by weight of the polyester elastomer (TPE-1).

Comparative Example 2

A film having a five-layer structure of front or back layer (5.0 μm)/adhesive layer (0.7 μm)/interlayer (23.6 μm)/adhesive layer (0.7 μm)/front or back layer (5.0 μm) with a total thickness of 35 μm was produced in the same manner as in Example 1, except that the resin used for the interlayer was the polystyrene resin (PS-2) and the resins used for the adhesive layers were 15% by weight of the polystyrene resin (PS-6) and 85% by weight of the polyester elastomer (TPE-2).

Comparative Example 3

A film having a five-layer structure of front or back layer (5.0 μm)/adhesive layer (0.7 μm)/interlayer (23.6 μm)/adhesive layer (0.7 μm)/front or back layer (5.0 μm) with a total thickness of 35 μm was produced in the same manner as in Example 1, except that the resin used for the front and back layers was the polyester resin (PET-2), the resin used for the interlayer was the polystyrene resin (PS-2), and the resin used for the adhesive layers was the polyester elastomer (TPE-2).

Comparative Example 4

A film having a five-layer structure of front or back layer (5.0 μm)/adhesive layer (0.8 μm)/interlayer (28.4 μm)/adhesive layer (0.8 μm)/front or back layer (5.0 μm) with a total thickness of 40 μm was produced in the same manner as in Example 1, except that the resins used for the adhesive layers were 25% by weight of the polystyrene resin (PS-5) and 75% by weight of the polyester resin (PET-1).

Comparative Example 5

A film having a five-layer structure of front or back layer (5.0 μm)/adhesive layer (0.8 μm)/interlayer (28.4 μm)/adhesive layer (0.8 μm)/front or back layer (5.0 μm) with a total thickness of 40 μm was produced in the same manner as in Example 1, except that the resins used for the adhesive layers were 25% by weight of the polystyrene resin (PS-1) and 75% by weight of the polyester resin (PET-1).

Comparative Example 6

A film having a five-layer structure of front or back layer (5.0 μm)/adhesive layer (0.8 μm)/interlayer (28.4 μm)/adhesive layer (0.8 μm)/front or back layer (5.0 μm) with a total thickness of 40 μm was produced in the same manner as in Example 1, except that the resins used for the adhesive layers were 75% by weight of the polystyrene resin (PS-1) and 25% by weight of the polyester resin (PET-1).
(Evaluation)

The heat shrinkable multilayer films obtained in the examples and comparative examples were evaluated for the following parameters. Table 1 shows the structure of the heat shrinkable multilayer films and the evaluation results.
(1) Heat Shrinkage The heat shrinkable multilayer film was cut into a size of 100 mm in the main shrinkage direction (TD)×100 mm in the direction orthogonal to the main shrinkage direction (MD), whereby a sample was prepared. The sample was immersed in hot water at 70° C. for 10 seconds. Then the sample was taken out and immediately immersed in tap water for 10 seconds. The length (L) of one side along the TD of the sample was measured, and the heat shrinkage in TD was calculated by Equation (1) below.

$$\text{Heat shrinkage (\%)} = \{(100-L)/100\} \times 100 \quad (1)$$

Figure 1:
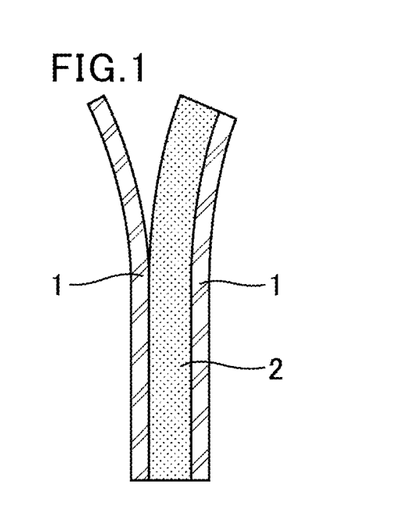
FIG. 1 is a schematic view illustrating how to peel a film in evaluation of the interlaminar strength.
Figure 2:
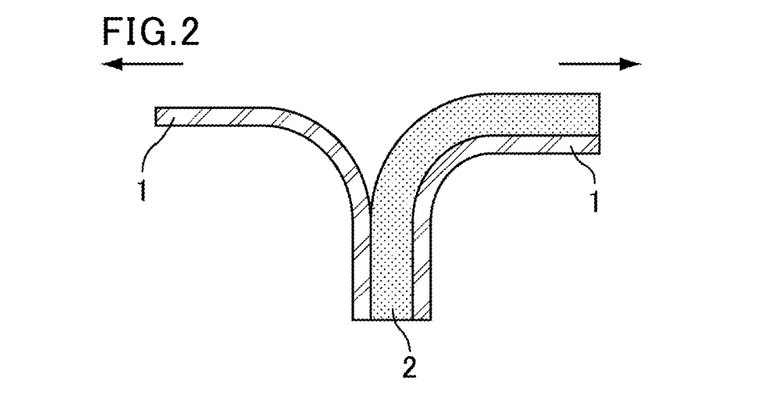
FIG. 2 is a schematic view illustrating how to peel a film in evaluation of the interlaminar strength.

This measurement was performed for three samples (n=3), and the average value thereof was taken as the shrinkage. The heat shrinkage in the case of immersion in hot water at 80° C. and that in the case of immersion in boiling water were also measured in the same manner.
(2) Interlaminar Strength at Normal Temperature The heat shrinkable multilayer film was cut into a size of 100 mm in length×10 mm in width, whereby a sample was prepared. A film end of the sample was partly delaminated as illustrated in FIG. 1. The strength (N/10 mm) when the sample was peeled at normal temperature (23° C.) in the 180-degree direction in the lengthwise direction of the sample as illustrated in FIG. 2 at a tension rate of 500 ram/min was measured with a peeling tester (Peeling TESTER HEIDON-17, Shinto Scientific Co., Ltd.). FIGS. 1 and 2 each are a schematic view illustrating how to peel the film in evaluation of interlaminar strength.

The test was performed in such a manner that the lengthwise direction was the main shrinkage direction (TD) or the direction (MD) orthogonal to the main shrinkage direction.

The test was performed 10 times for each of the MD and TD directions, and the average interlaminar strength in each direction was obtained.

The interlaminar strength in each of the MD and TD directions was evaluated using the obtained average values based on the following criteria. The film rated as "0 (good)" can suppress defects such as peeling of a heat shrinkable label upon attachment of the label to a container.
(Interlaminar Strength in MD Direction)

The average interlaminar strength of 0.50 N/10 mm or higher was rated "○ (good)" and the average interlaminar strength of less than 0.50 N/10 mm was rated "x (poor)".
(Interlaminar Strength in TD Direction)

The average interlaminar strength of 0.50 N/10 mm or higher was rated "○ (good)" and the average interlaminar strength of less than 0.50 N/10 mm was rated "x (poor)".
(3) Evaluation of Peeled Surface at Normal Temperature In measurement of the delamination strength at normal temperature, the delaminated interface in measurement in the TD direction was observed and evaluated based on the following criteria.
(Evaluation of Peeled Surface)

A case where the film was delaminated at the interface between the interlayer and the adhesive layer was rated "0 (good)". A case where the film was delaminated at the interface between the front or back layer and the adhesive layer was rated "x (poor)".

Figure 3:
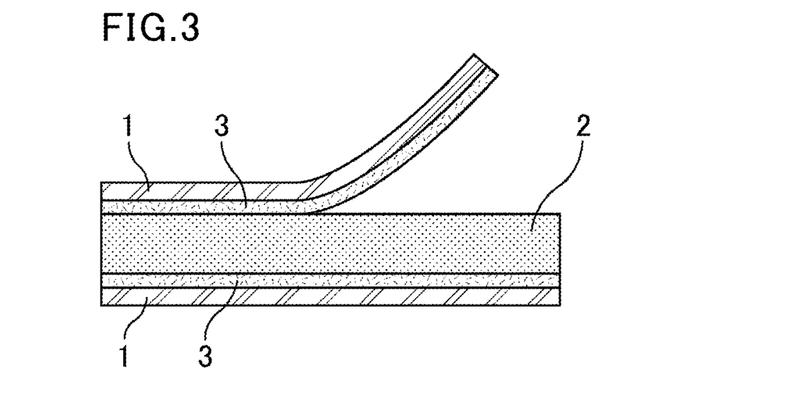
FIG. 3 is a schematic view illustrating a heat shrinkable multilayer film in which peeling occurs at the interface between an interlayer and an adhesive layer.
Figure 4:
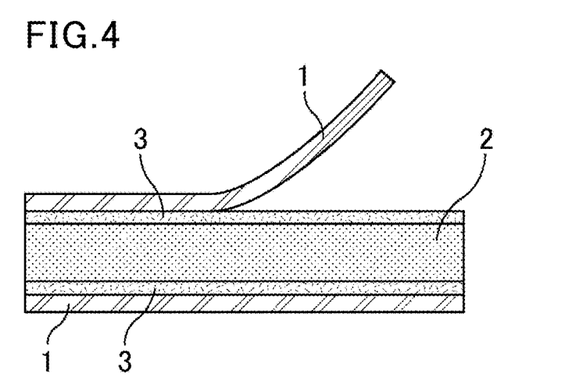
FIG. 4 is a schematic view illustrating a heat shrinkable multilayer film in which peeling occurs at the interface between a front layer and an adhesive layer.

When the heat shrinkable label is attached to a container, a flaw may be made in the surface layer on the outer side of the heat shrinkable label due to a load applied upon folding of the label by a label-attaching machine or the like. The flaw in the surface layer may become a starting point of delamination. In the worst case, the label may be peeled after the attachment. Whether or not the label is peeled depends on which interface suffers delamination in the heat shrinkable multilayer film. FIG. 3 is a schematic view illustrating a heat shrinkable multilayer film in which peeling occurs at the interface between the interlayer and the adhesive layer. FIG. 4 is a schematic view illustrating a heat shrinkable multilayer film in which peeling occurs at the interface between the front layer and the adhesive layer.

In the case where delamination occurs at the interface between the interlayer and the adhesive layer as illustrated in FIG. 3, even if a flaw is made by a label-attaching machine, delamination does not progress, provided that the flaw does not penetrate through the front layer and the adhesive layer. In such a case, peeling of the label is not likely to occur. In the case where delamination occurs at the interface between the front layer and the adhesive layer as illustrated in FIG. 4, a flaw made in the surface layer causes progress of the delamination, leading to peeling of the label.

(4) Presence or Absence of Zipping at Normal Temperature

The heat shrinkable multilayer film was cut into a size of 100 mm in length×10 mm in width, and left at normal temperature (23° C.) for 10 minutes. A film end of the sample was partly delaminated in the same manner as in the evaluation of the interlaminar strength. The presence or absence of zipping was evaluated based on the following criteria. When the zipping is determined to be "present", the interlaminar strength is not uniform.

When the interlaminar strength is not uniform, the peeling resistance is high at a part where the interlaminar strength is high and the peeling resistance is low at a part where the interlaminar strength is low. When a heat shrinkable multilayer film with nonuniform peeling resistance is peeled, a part where delamination stops and a part where delamination rapidly progresses are regularly or irregularly present therein, and such a state of the film is referred to as zipping.

(Presence or Absence of Zipping)

Present: A stripe pattern was left on the peeled front or back layer.

Absent: A stripe pattern was not left on the peeled front or back layer.

(5) Interlaminar Strength at Low Temperature

The heat shrinkable multilayer film was cut into a size of 100 mm in length×10 mm in width, and left at low temperature (5° C.) for 10 minutes. Then, the interlaminar strength (N/10 mm) thereof was determined. The measurement was performed in the same manner as in the evaluation of the interlaminar strength at normal temperature, except that the temperature was set to 5° C.

In each measurement, the interlaminar strength in the TD direction and the minimum value thereof were determined. The measurement was performed 10 times, and the average of the obtained 10 values of the interlaminar strength in the TD direction was determined as the average value in the TD direction. Similarly, the average of the obtained 10 minimum values was determined as the average minimum value in the TD direction. Evaluation at low temperature, especially, measurement of the interlaminar strength in the TD direction shows the resistance of a heat shrinkable label against delamination under a load in the TD direction by a label-attaching machine or the like in a low-temperature environment. Determination of the average and the minimum value of the interlaminar strength in the TD direction show the degree of variation in the delamination strength in a low-temperature environment.

(Interlaminar Strength in TD Direction)

The average interlaminar strength of 0.50 N/10 mm or more was rated "0 (good)". The average interlaminar strength of less than 0.50 N/10 mm was rated "x (poor)".

(6) Evaluation of Peeled Surface at Low Temperature

In measurement of the delamination strength in the TD direction at low temperature, the delamination interface was observed and evaluated based on the same criteria as those in the evaluation of the peeled surface at normal temperature.

(7) Presence or Absence of Zipping at Low Temperature

The heat shrinkable multilayer film was cut into a size of 100 mm in length×10 mm in width, and left at low temperature (5° C.) for 10 minutes. A film end of the sample was partly delaminated in the same manner as in the evaluation of the interlaminar strength. The presence or absence of zipping was evaluated based the same criteria as those for the evaluation of the presence or absence of zipping at normal temperature.

(8) Evaluation of Delamination after Bending Label

Figure 5:
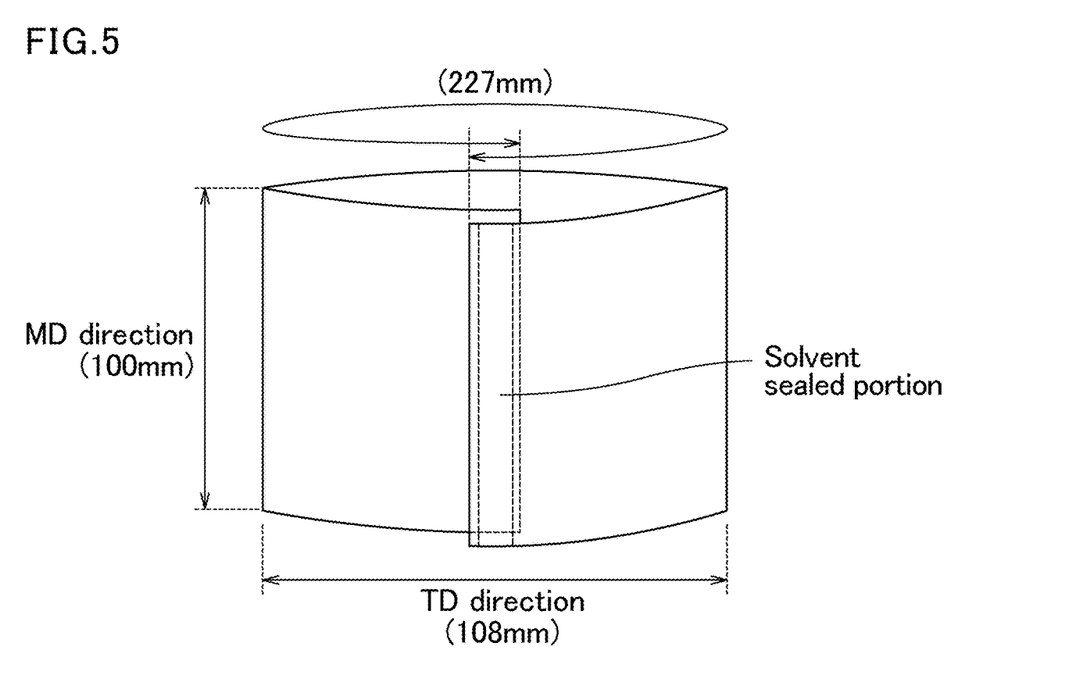
FIG. 5 is a schematic view illustrating a heat shrinkable label used for evaluation of the flexibility of a label.

The obtained heat shrinkable multilayer film was cut at a width of 227 mm in the TD direction. A solvent prepared by mixing 100 parts by weight of 1,4-dioxolan and 30 parts by weight of cyclohexane was applied to the film in a width of 3 mm in a direction parallel with the MD direction. The film was bent flatly and both end portions were bonded to each other to form a cylinder with a width of 108 mm in the TD direction. The cylindrical heat shrinkable multilayer film was cut at a width of 100 mm in the MD direction as illustrated in FIG. 5, thereby preparing a heat shrinkable label. FIG. 5 is a schematic view illustrating a heat shrinkable label used in the evaluation of flexibility. A part where the both end portions of the label was sealed with the solvent is also referred to as "solvent-sealed portion".

Then, both ends of the solvent-sealed portion of the heat shrinkable label were held with fingers under a low-temperature (5° C.) atmosphere, and bent 20 times in such a manner that the stress was applied in the TD direction. The label was bent at six portions, thereby preparing a bent heat shrinkable label.

The bent heat shrinkable label was attached to a 275-g round metal bottle (diameter: about 66 mm) and immersed in boiling water for 10 seconds, so that the label was heat-shrunk to cover the container. The appearance of the solvent-sealed portions of the resulting label was evaluated based on the following criteria.

○ (good): Delamination did not occur at any solvent-sealed portion in all the 10 labels.

Δ (acceptable): Delamination occurred at solvent-sealed portions in 1 or 2 labels among 10 labels.

x (poor): Delamination occurred at solvent-sealed portions in 3 or more labels among 10 labels.

(9) Evaluation of Crease-Whitening

The heat shrinkable multilayer film (film width: 500 mm) was subjected to gravure printing using Finestar (black) (Toyo Ink Co., Ltd.) followed by gravure printing using Finestar (white) (Toyo Ink Co., Ltd.). In this manner, the heat shrinkable multilayer film with bicolor back print (black/white) was prepared. The printing plate used was prepared by direct laser platemaking with an engraving depth of 30 μm and the number of lines of 175.

Then, the heat shrinkable multilayer film was cut in a black print portion into a rectangle with a size of 100 mm in the MD direction×200 mm in the TD direction, whereby a cut sample was prepared. The obtained cut sample was folded in such a manner that the printed face is inside, and rubber roller was pressed to the cut sample twice at a normal temperature (23° C.) in a direction parallel with the MD direction at a load of 2 kg and a rate of 2 seconds/100 mm. In this manner, the cut sample got a crease. The cut sample was unfolded, and the rubber roller was further pressed once at a load of 2 kg and a rate of 2 seconds/100 mm to smooth the crease. Then, the sample was immersed in hot water at 75° C. for seven seconds using a jig that can control the shrinkage in the TD direction. The sample was shrunk 5% in the TD direction. The appearance of the crease was evaluated based on the following criteria.

Figure 6:
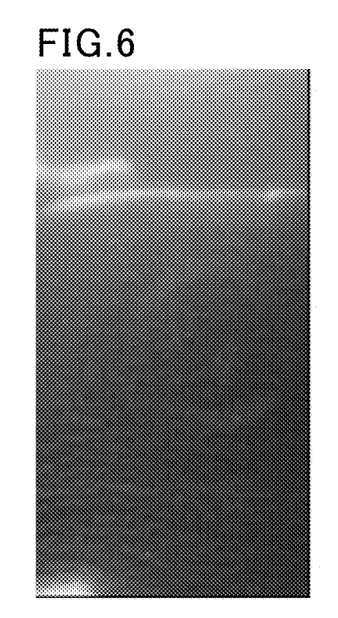
FIG. 6 is a photograph showing an exemplary case where crease-whitening is not observed in evaluation of crease-whitening.
Figure 7:
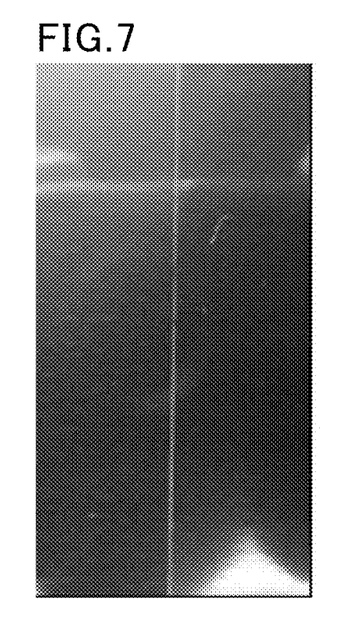
FIG. 7 is a photograph showing an exemplary case where crease-whitening is observed in evaluation of crease-whitening.

In the evaluation of the appearance, the sample was illuminated by a fluorescent lamp from a 45-degree oblique direction against the sample, and visually observed by ten persons on the opposite side of the fluorescent lamp from a 45-degree direction relative to the sample. FIG. 6 shows an exemplary case where crease-whitening is not observed. FIG. 7 shows an exemplary case where crease-whitening is observed.

(Evaluation of Crease-Whitening)

○ (good): All the ten persons could not observe crease-whitening.

Δ (acceptable): One or two of the ten persons observed crease-whitening.

x (poor): Three or more of the ten persons observed crease-whitening.

(10) Change in Transparency after Heat Treatment

The haze value of the heat shrinkable multilayer film was measured before and after the heat treatment, and the change rate thereof was obtained. The heat treatment was performed by the same method as that in the measurement of the heat shrinkage under the conditions of immersion in boiling water for 10 seconds. The haze value was measured in conformity with ASTM D-1003 using a haze meter NDH5000 (Nippon Denshoku Industries Co., Ltd.).

The change rate was calculated by the following equation.

Change rate=(Haze value after heat treatment/haze value before heat treatment)×100

○ (good): Change rate of less than 400%.

x (poor): Change rate of 400% or more.

(Comprehensive Evaluation)

○ (good): The film was not rated "x (poor)" in any of the evaluations (1) to (10).

x (poor): The film was rated "x (poor)" at least once in the evaluations of (1) to (10).

TABLE 1

| | | | | Example 1 | Example 2 | Example 3 | Example 4 | Example 5 | Example 6 | Example 7 | Example 8 | Example 9 |
|---|---|---|---|---|---|---|---|---|---|---|---|---|
| Constituting resin (% by weight) | Front and back layers | Polyester resin | PET-1 | 100 | 100 | 100 | 100 | 100 | | | | 100 |
| | | | PET-2 | | | | | | 100 | 100 | 100 | |
| | Interlayer | Polystyrene resin | PS-1 | 100 | 100 | | | | | | | 100 |
| | | | PS-2 | | | 100 | 100 | | | | 100 | |
| | | | PS-3 | | | | | 100 | | 100 | | |
| | | | PS-4 | | | | | | 100 | | | |
| | Adhesive layer | Polystyrene resin | PS-1 | | | | | | | | | |
| | | | PS-5 | 60 | | 50 | 40 | 40 | 20 | | | 20 |
| | | | PS-6 | | 60 | | | | | 50 | | |
| | | | PS-7 | | | | | | | | 25 | |
| | | | PS-8 | | | | | | | | | 15 |
| | | Polyester elastomer | TPE-1 | 40 | 40 | | 60 | | | 50 | | 65 |
| | | | TPE-2 | | | 50 | | 60 | 80 | | 75 | |
| | | Polyester resin | PET-1 | | | | | | | | | |
| Evaluation | Heat shrinkage (%) | 70° C. | 10 sec | 39 | 40 | 38 | 38 | 40 | 21 | 22 | 22 | 42 |
| | | 80° C. | | 64 | 64 | 63 | 63 | 64 | 59 | 60 | 61 | 65 |
| | | Boiling water | | 80 | 80 | 80 | 80 | 80 | 75 | 75 | 76 | 80 |
| | Interlaminar strength at normal temperature (23° C.) (N/10 mm) | Average value in MD direction | | 1.00 | 1.04 | 0.91 | 0.89 | 1.03 | 0.93 | 0.91 | 1.11 | 0.99 |
| | | Evaluation of interlaminar strength | | ○ | ○ | ○ | ○ | ○ | ○ | ○ | ○ | ○ |
| | | Average value in TD direction | | 0.91 | 0.94 | 0.82 | 0.77 | 0.80 | 0.81 | 0.83 | 0.92 | 0.96 |
| | | Evaluation of interlaminar strength | | ○ | ○ | ○ | ○ | ○ | ○ | ○ | ○ | ○ |
| | Peeled surface upon measurement of delamination strength at normal temperature (23° C.) in TD direction | | | Between interlayer and adhesive layer | | | | | | | | |
| | Evaluation of peeled surface at normal temperature (23° C.) | | | ○ | ○ | ○ | ○ | ○ | ○ | ○ | ○ | ○ |
| | Presence or absence of zipping at normal temperature (23° C.) | | | Absent | Absent | Absent | Absent | Absent | Absent | Absent | Absent | Absent |
| | Interlaminar strength at low temperature (5° C.) (N/10 mm) | Average value in TD direction | | 1.23 | 1.11 | 1.15 | 0.90 | 0.93 | 0.96 | 1.10 | 0.88 | 1.18 |
| | | Minimum value in TD direction | | 0.90 | 0.89 | 1.00 | 0.73 | 0.75 | 0.81 | 0.93 | 0.71 | 0.94 |
| | | Evaluation of interlaminar strength | | ○ | ○ | ○ | ○ | ○ | ○ | ○ | ○ | ○ |
| | Peeled surface upon measurement of delamination strength at low temperature (5° C.) in TD direction | | | Between interlayer and adhesive layer | | | | | | | | |
| | Evaluation of peeled surface at low temperature (5° C.) | | | ○ | ○ | ○ | ○ | ○ | ○ | ○ | ○ | ○ |
| | Presence or absence of zipping at low temperature (5° C.) | | | Absent | Absent | Absent | Absent | Absent | Absent | Absent | Absent | Absent |
| | Evaluation of delamination after bending label | | | 1/10 | 0/10 | 0/10 | 0/10 | 0/10 | 0/10 | 0/10 | 0/10 | 0/10 |
| | Evaluation of flexibility | | | Δ | ○ | ○ | ○ | ○ | ○ | ○ | ○ | ○ |
| | Evaluation of crease-whitening | | | ○ | ○ | ○ | ○ | ○ | Δ | ○ | ○ | ○ |

TABLE 1-continued

| | | | | | | | | | | |
|---|---|---|---|---|---|---|---|---|---|---|
| Change rate of transparency after heat treatment (%) | | | | 280 | 278 | 285 | 290 | 290 | 390 | 287 | 380 | 310 |
| Evaluation based on change rate of transparency | | | | ○ | ○ | ○ | ○ | ○ | ○ | ○ | ○ | ○ |
| Comprehensive evaluation | | | | ○ | ○ | ○ | ○ | ○ | ○ | ○ | ○ | ○ |

| | | | | Comparative Example 1 | Comparative Example 2 | Comparative Example 3 | Comparative Example 4 | Comparative Example 5 | Comparative Example 6 |
|---|---|---|---|---|---|---|---|---|---|
| Constituting resin (% by weight) | Front and back layers | Polyester resin | PET-1 | 100 | 100 | | 100 | 100 | 100 |
| | | | PET-2 | | | 100 | | | |
| | Interlayer | Polystyrene resin | PS-1 | 100 | | | 100 | 100 | 100 |
| | | | PS-2 | | 100 | 100 | | | |
| | | | PS-3 | | | | | | |
| | | | PS-4 | | | | | | |
| | Adhesive layer | Polystyrene resin | PS-1 | | | | | 25 | 75 |
| | | | PS-5 | 75 | | | 25 | | |
| | | | PS-6 | | 15 | | | | |
| | | | PS-7 | | | | | | |
| | | | PS-8 | | | | | | |
| | | Polyester elastomer | TPE-1 | 25 | | | | | |
| | | | TPE-2 | | 85 | 100 | | | |
| | | Polyester resin | PET-1 | | | | 75 | 75 | 25 |
| Evaluation | Heat shrinkage (%) | 70° C. | 10 sec | 40 | 38 | 22 | 39 | 38 | 40 |
| | | 80° C. | | 63 | 62 | 59 | 63 | 62 | 64 |
| | | Boiling water | | 80 | 79 | 74 | 80 | 79 | 81 |
| | Interlaminar strength at normal temperature (23° C.) (N/10 mm) | Average value in MD direction | | 0.97 | 1.03 | 1.16 | 0.80 | 0.21 | 0.43 |
| | | Evaluation of interlaminar strength | | ○ | ○ | ○ | ○ | x | ○ |
| | | Average value in TD direction | | 0.97 | 0.82 | 0.76 | 0.75 | 0.34 | 0.59 |
| | | Evaluation of interlaminar strength | | ○ | ○ | ○ | ○ | x | ○ |
| | Peeled surface upon measurement of delamination strength at normal temperature (23° C.) in TD direction | | | Between interlayer and adhesive layer | | | | | |
| | Evaluation of peeled surface at normal temperature (23° C.) | | | ○ | ○ | ○ | ○ | ○ | ○ |
| | Presence or absence of zipping at normal temperature (23° C.) | | | Absent | Absent | Absent | Absent | Absent | Absent |
| | Interlaminar strength at low temperature (5° C.) (N/10 mm) | Average value in TD direction | | 0.48 | 0.98 | 0.95 | 0.26 | 0.14 | 0.22 |
| | | Minimum value in TD direction | | 0.00 | 0.74 | 0.77 | 0.00 | 0.00 | 0.00 |
| | | Evaluation of interlaminar strength | | x | ○ | ○ | x | x | x |
| | Peeled surface upon measurement of delamination strength at low temperature (5° C.) in TD direction | | | Between front or back layer and adhesive layer | Between interlayer and adhesive layer | Between interlayer and adhesive layer | Between interlayer and adhesive layer | Between interlayer and adhesive layer | Between front or bach layer and adhesive layer |
| | Evaluation of peeled surface at low temperature (5° C.) | | | x | ○ | ○ | ○ | ○ | ○ |
| | Presence or absence of zipping at low temperature (5° C.) | | | Present | Absent | Absent | Present | Present | Present |
| | Evaluation of delamination after bending label | | | 7/10 | 0/10 | 0/10 | 5/10 | 4/10 | 7/10 |
| | Evaluation of flexibility | | | x | ○ | ○ | x | x | x |
| | Evaluation of crease-whitening | | | ○ | x | x | ○ | ○ | ○ |
| | Change rate of transparency after heat treatment (%) | | | 290 | 578 | 580 | 302 | 295 | 280 |
| | Evaluation based on change rate of transparency | | | ○ | x | x | ○ | ○ | ○ |
| | Comprehensive evaluation | | | x | x | x | x | x | x |

The heat shrinkable multilayer films obtained in Examples 1 to 9 were favorably rated in all of the evaluations. Even if delamination occurs in the heat shrinkable multilayer film, the delamination occurs at the interface between the interlayer and the adhesive layer, and therefore, peeling of the label does not occur.

In the case of Comparative Examples 1 to 6 in which the mixing ratio of the resins for the adhesive layers does not fall within the range specified in the present invention, the interlaminar strength was lowered at low temperature, the appearance was impaired due to whitening of creases which occurred when the film was strongly folded in the solvent sealing step, and/or delamination occurred due to the impact upon attachment thereof to a container. In addition, zipping occurred at low temperature.

INDUSTRIAL APPLICABILITY

The present invention can provide a heat shrinkable multilayer film which has excellent adhesiveness between front and back layers and an interlayer not only at normal temperature but also at low temperature to effectively prevent delamination and is less likely to have residual white streaks along creases. The present invention can also provide a heat shrinkable label including the heat shrinkable multilayer film.

REFERENCE SIGNS LIST

1: Front or back layer
2: Interlayer
3: Adhesive layer

The invention claimed is:

1. A heat shrinkable multilayer film comprising:
front and back layers each consisting of a polyester resin;
an interlayer consisting of a polystyrene resin; and
adhesive layers each consisting of a polystyrene resin and a polyester elastomer,
wherein the front and back layers and the interlayer are stacked with the adhesive layers interposed therebetween,
the polyester resin in the front layer and the back layer is an aromatic polyester resin derived from condensation polymerization of at least one diol component and at least one dicarboxylic acid component comprising terephthalic acid in a range of 55 mol % or more in the at least one dicarboxylic acid component as 100 mol %,
the polystyrene resin in the interlayer is a styrene-butadiene copolymer having a styrene content in a range from 78 to 84% by weight and butadiene content in a range from 16 to 22% by weight,
the adhesive layers each consists of from 30 to 49% by weight of the polystyrene resin and from 51 to 70% by weight of the polyester elastomer,
the polystyrene resin in the adhesive layer a styrene-butadiene copolymer having a styrene content in a range from 65 to 71% by weight and a butadiene content in a range from 29 to 35% by weight,
the polyester elastomer in the adhesive layers is a block copolymer comprising an aromatic polyester as a hard segment and a polyalkylene ether glycol as a soft segment, and
the polyester elastomer has a glass transition temperature in a range from −70° C. to 0° C.

2. The heat shrinkable multilayer film according to claim 1,
wherein the polyester elastomer contained in the adhesive layers has a melting point in a range from 120° C. to 200° C.

3. The heat shrinkable multilayer film according to claim 1,
wherein the polyester elastomer contained in the adhesive layers has a specific gravity in a range from 0.95 to 1.20.

4. The heat shrinkable multilayer film according to claim 1,
wherein the polyester elastomer contained in the adhesive layers is modified by an α,β-ethylenically unsaturated carboxylic acid.

5. A heat shrinkable label, comprising the heat shrinkable multilayer film according to claim 1.

* * * * *